Sept. 17, 1968  H. R. McFARLAND  3,402,003

MOUNT FOR LENS ASSEMBLY

Filed April 27, 1965

INVENTOR
HARRY R. McFARLAND
BY
*Alvin Guiderland*
ATTORNEY

United States Patent Office 3,402,003
Patented Sept. 17, 1968

3,402,003
MOUNT FOR LENS ASSEMBLY
Harry R. McFarland, Peekskill, N.Y., assignor to The Ednalite Corporation, Peekskill, N.Y., a corporation of New York
Filed Apr. 27, 1965, Ser. No. 451,248
5 Claims. (Cl. 350—252)

ABSTRACT OF THE DISCLOSURE

A lens mount is provided with an inward facing circumferentially grooved surface oriented between the elements of an optical system to reduce internal reflection.

This invention relates generally to mounts for lens assemblies which are made up of a plurality of optical elements.

The mounts for lens assemblies made up of a plurality of lens or other optical elements usually include a cylindrical barrel formed with an internal shoulder adjacent one end so that all of the lens or other optical elements are inserted through the opposite end of the barrel and are located from the single shoulder by successive build-up of the lens or other optical elements with separators therebetween. Where the entire lens assembly is built-up or located within the barrel from a single shoulder or locating surface adjacent one end of the barrel, it is difficult to achieve accurate axial alignment of all of the lens or optical elements by reason of the accumulation of alignment errors. Thus, considerable assembly time and expense is required to achieve axial alignment of the several lens or other optical elements with the requisite accuracy, particularly when distortion is to be avoided over a field of view that is circular or otherwise shaped so as to have relatively large dimensions in all directions.

Accordingly, it is an object of this invention to provide mounts for lens assemblies made up of a plurality of lens or other optical elements, and which facilitate the attainment of accurate axial alignment of such elements.

In accordance with an aspect of this invention, the mount of a lens assembly comprises a generally cylindrical barrel having an inwardly directed, annular flange located intermediate the ends of the barrer with parallel machined locating surfaces being provided at the opposite sides of the flange and formed with outer margins constituted by concentric circles, and a plurality of lens or other optical elements are inserted into the barrel through the opposite ends thereof and engage the locating surfaces at the respective sides of the flange so as to be relatively located thereby when locked within the barrel by suitable retaining means. Since the locating surfaces at opposite sides of the flange are accurately machined so as to lie in parallel planes, and since the several lens or other optical elements are located from such parallel surfaces at opposite sides of the flange, the likelihood of the building-up or accumulation of errors in axial alignment is substantially reduced thereby facilitating the assembling of the several lens or other optical elements in a manner to avoid distortion over a relatively large field.

In accordance with another feature of this invention, the flange located intermediate the ends of the mounting barrel is provided with at least one radially inward facing surface formed with circumferential grooves of V-shaped cross-section and having a generating line which is inclined relative to the axis of the barrel to enclose an acute angle therewith, for example, in the range between two and five degrees, and such angle opens in the direction opposed to the entry of light into the lens assembly. By reason of such inclination of the grooved surface or surfaces of the flange, light rays entering the lens assembly and incident at the grooved surface of the flange over a large range of angles with respect to the optical axis will be trapped or intercepted by the grooved surface and thereby prevented from being reflected back into the light path so as to wash-out the imagery.

The above, and other objects, features and advantages of this invention, will be apparent in the following detailed description of illustrative embodiments thereof which is to be read in connection with the accompanying drawing forming a part hereof, and wherein.

Figure 1:
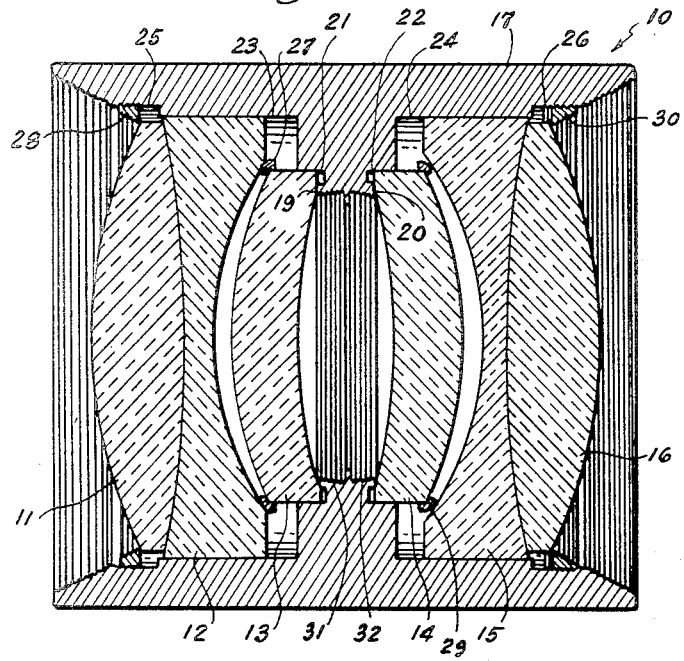
FIG. 1 is an axial sectional view of a lens assembly having a mount in accordance with one embodiment of this invention.
Figure 4:
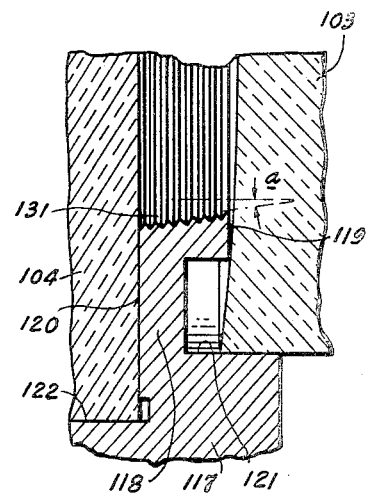
FIG. 4 is an enlarged fragmentary sectional view showing a detail of the mount of FIG. 3.

Referring to the drawing in detail, and initially to FIG. 1 thereof, it will be seen that the lens assembly 10 there illustrated is in the form of asymmetrical six-element lens system consisting of a crown 11 and flint 12 cemented together to form a first doublet, two meniscus lenses 13 and 14, and a flint 15 and crown 16 cemented together to form a second doublet. The doublet 11 and 12 and the doublet 15 and 16 are identical, as are the meniscus lenses 13 and 14, and equal axial air spaces are provided between the flint 12 and meniscus lens 13 and between meniscus lens 14 and fling 15 so that the lens system is symmetrical about the plane midway between the meniscus lenses 13 and 14.

In accordance with the present invention, the mount for the lens elements 11, 12, 13, 14, 15 and 16 includes a generally cylindrical barrel 17 which, intermediate its ends, is formed with an inwardly directed, annular flange 18 having two axially spaced, parallel annular locating surfaces 19 and 20 which are directed radially at the opposite sides of flange 18 so as to face toward the opposite ends of barrel 17. The surfaces 19 and 20 have their outer margins constituted by concentric circular edges. Extending from the opposite sides of flange 18 are internal cylindrical surfaces 21 and 22 followed by larger diameter internal cylindrical surfaces 23 and 24 which, in turn, terminate in counterbored internally threaded portions 25 and 26.

In assembling the several lens elements within barrel 17, meniscus lens 13 is inserted through one end of the barrel so as to seat against the circular outer edge of locating surface 19 at one side of flange 18 and to be radially located by that circular edge and by the adjacent internal cylindrical surface 21. The doublet 11 and 12 is inserted through the same end of barrel 17 as the meniscus lens 13 and is axially located from the latter by means of a lens separator 27, while the internal cylindrical surface 23 serves to radially locate the doublet. The doublet 11 and 12 and the meniscus lens 13 are all locked within barrel 17 by means of a retaining ring 28 which is screwed into engagement with the threaded end portion 25 of the internal surface of the barrel. The meniscus lens 14 is inserted into barrel 17 through the end of the latter opposed to that through which meniscus lens 13 was inserted, and meniscus lens 14 seats against the circular outer edge of locating surface 20 of flange 18 and is radially located by that edge and by the internal cylindrical surface 22. The doublet 15 and 16 is inserted into the barrel through the same end as meniscus lens 14 and is axially located relative to the latter by means of a lens separator 29 interposed therebetween, while radial location of doublet 15 and 16 is effected by the internal cylindrical surface 24. The meniscus lens 14 and doublet 15 and 16 are locked in position within barrel 17 by means of a retaining ring 30 screwed into the threaded end portion 26.

Since the locating surfaces 19 and 20 may be conveniently machined so as to lie in exactly parallel planes and to have exactly concentric circular outer edges, and since only one-half of the lens elements of the assembly are located from each of the surfaces 19 and 20, it will be apparent that greater accuracy is achieved in obtaining axial alignment of all of the lens elements than would be the case where the lens elements are all located successively from a single surface at one end of the barrel.

Figure 2:
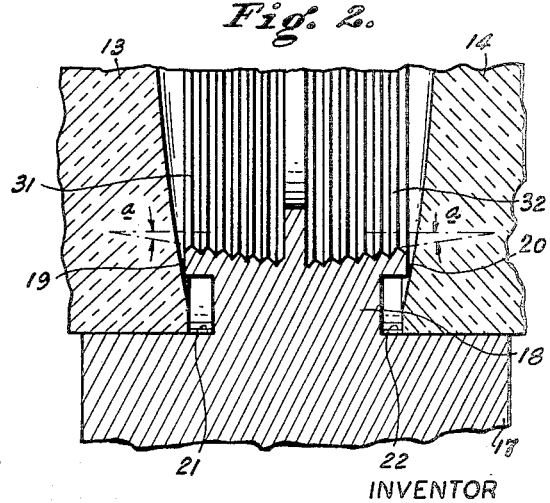
FIG. 2 is an enlarged, fragmentary sectional view showing a detail of the amount of FIG. 1.

In order to ensure that light rays entering the assembly 10 at a large angle to the optical axis will not be reflected from the radially inwardly facing surfaces of flange 18 back into the light path, thereby to wash out the imagery, the flange 18 has circumferentially grooved, radially inwardly facing surfaces 31 and 32 at opposite sides of the median plane of the flange, that is, the plane of symmetry of the lens system, which surfaces 31 and 32 have generating lines at an acute angle $a$ to the axis of barrel 17, as shown particularly on FIG. 2. The angle $a$ between the generating line of each of surfaces 31 and 32 and the axis of the barrel is preferably in the range between two and five degrees, and such angle, in each case, opens in the direction toward the median plane of the flange or the plane of symmetry of the lens system, that is, in the direction away from the closest end of the barrel through which light may enter the lens system. By reason of the inclination of the generating lines of threaded surfaces 31 and 32, light rays incident at such surfaces over a large range of angles with respect to the optical axis are trapped or intercepted by the grooved surfaces and thereby prevented from being reflected back into the light path in a manner to wash out the imagery.

Figure 3:
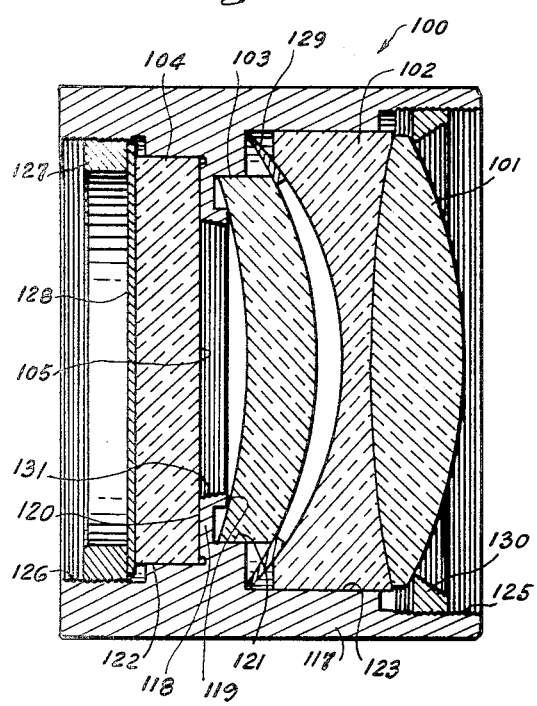
FIG. 3 is an axial sectional view of a lens assembly having a mount in accordance with another embodiment of this invention.

Referring now to FIG. 3, it will be seen that the invention is there shown applied to an assembly 100 of lens elements 101, 102 and 103 and a mirror element 104 which are optically the equivalent of a symmetrical six-element lens system of the type shown on FIG. 1, and in which the plane of symmetry is constituted by the reflecting surface 105 of mirror element 104. In the lens system of FIG. 3, light passes successively through the crown 101 and flint 102 forming the cemented doublet and then through the meniscus lens 103 for reflection by the surface 105 prior to passing again through meniscus lens 103, flint 102 and crown 101.

In accordance with this invention, the mount for the lens system of FIG. 3 includes a generally cylindrical barrel 117 formed with an inwardly directed annular flange 118 intermediate its opposite ends, and such flange has its opposite sides suitably machined so as to provide accurately parallel locating surfaces 119 and 120 which are radially directed and face toward the opposite ends of the barrel. The barrel 117 further has internal cylindrical surfaces 121 and 122 extending from opposite sides of flange 118, and a larger diameter internal cylindrical surface 123 extending from cylindrical surface 121 and terminating in a counterbored, internally threaded portion 125. The internal cylindrical surface 122 also terminates in a counterbored internally threaded portion 126.

In assembling the lens system of FIG. 3, the mirror element 104 is inserted through one end of barrel 117 to have its reflecting surface 105 seat against locating surface 120 and to be radially located by cylindrical surface 122. The mirror element 104 is locked in position within barrel 117 by means of a retaining ring 127 which is screwed into threaded portion 126 and bears, by way of a backing disk 127 against mirror element 104. The meniscus lens 103 is inserted through the opposite end of barrel 117 so as to be axially located by the circular outer edge of locating surface 119 and radially located by that circular edge and by the cylindrical surface 121. The doublet 102 and 101 is axially located from meniscus lens 103 by means of an interposed lens separator 129 and is radially located by the internal cylindrical surface 123. The meniscus lens 103 and doublet 102 and 101 are locked in position within barrel 117 by means of a retaining ring 130 screwed into threaded portion 125 so as to engage against the crown 101 of the doublet. Since the meniscus 103 and the reflecting surface 105 of mirror element 104 engage the parallel surfaces 119 and 120 at opposite sides of flange 118, it is apparent that any lack of parallelism of the opposite surfaces of the mirror element cannot affect the accuracy of the axial alignment of the lens system.

As in the previously described embodiment of the invention, the flange 118 has its radially inward directed surface 131 circumferentially grooved and formed with a generating line which is disposed at an acute angle $a$ with respect to the axis of the barrel. Such angle $a$ opens in the direction away from the entry of light into the lens assembly, that is, in the direction toward the equivalent plane of symmetry of the lens system constituted by the reflecting surface 105 engaging locating surface 119. The grooving of the surface 131 and the inclination of its generating line relative to the axis of the barrel, as described above, once again cooperate to ensure the intercepting or trapping of light incident on the surface 131 at a large range of angles with respect to the optical axis, thereby preventing such light from being reflected back into the light path to effect washing out of the imagery.

Although illustrative embodiments of this invention have been described in detail herein with reference to the accompanying drawing, it is to be understood that the invention is not limited to those precise embodiments, and that various changes and modifications may be effected therein by one skilled in the art without departing from the scope or spirit of the invention, except as defined in the appended claims.

What is claimed is:

1. In a lens assembly comprising a generally cylindrical barrel having an inwardly directed, annular flange located intermediate the ends of the barrel and which is formed with parallel machined locating surfaces at the opposite sides of the flange, a plurality of optical elements inserted into said barrel through the opposite ends thereof and engaging said locating surfaces at the respective sides of the flange so as to be relatively located thereby, and means retaining the optical elements in the barrel against said locating surfaces; the improvement of at least one radially inward facing, circumferentially grooved surface on said flange having a generating line which is inclined relative to the axis of said barrel to enclose an acute angle therewith opening in the direction opposed to the entry of light into the lens assembly.

2. A lens assembly according to claim 1, in which said acute angle is between 2° and 5°.

3. A lens assembly according to claim 1, in which said optical elements include optically aligned identical lenses at the opposite sides of said flange to form a symmetrical lens system having its plane of symmetry at the median plane of the flange, and in which said flange has said one radially inward facing surface at one side of said median plane and another radially inward facing, circumferentially grooved surface at the other side of said median plane, said other radially inward facing surface also having a generating line enclosing an acute angle with the axis of the barrel, with each said acute angle opening in the direction toward said median plane of the flange.

4. A lens assembly according to claim 1, in which said optical elements include axially aligned lenses at one side of said flange and a mirror element at the other side of said flange having a planar reflecting surface engaged with the respective locating surface of the flange to form the optical equivalent of a symmetrical lens system having twice the number of said lenses and a plane of symmetry at said reflecting surface of the mirror element, and said acute angle opens in the direction toward the side of said flange having the locating surface engaged by said reflecting surface of the mirror element.

5. A lens assembly according to claim 1, in which said optical elements define a symmetrical lens system having an effective plane of symmetry at said flange, and said acute angle enclosed by the generating line of each said grooved surface and by the barrel axis opens in the direction toward said plane of symmetry.

References Cited

UNITED STATES PATENTS

| 1,943,378 | 1/1934 | Elms | 350—220 |
| 2,683,397 | 7/1954 | Loeck | 350—252 |

FOREIGN PATENTS

| 1,378,656 | 2/1963 | France. |

DAVID SCHONBERG, *Primary Examiner.*

M. J. TOKAR, *Assistant Examiner.*